Figure 1:
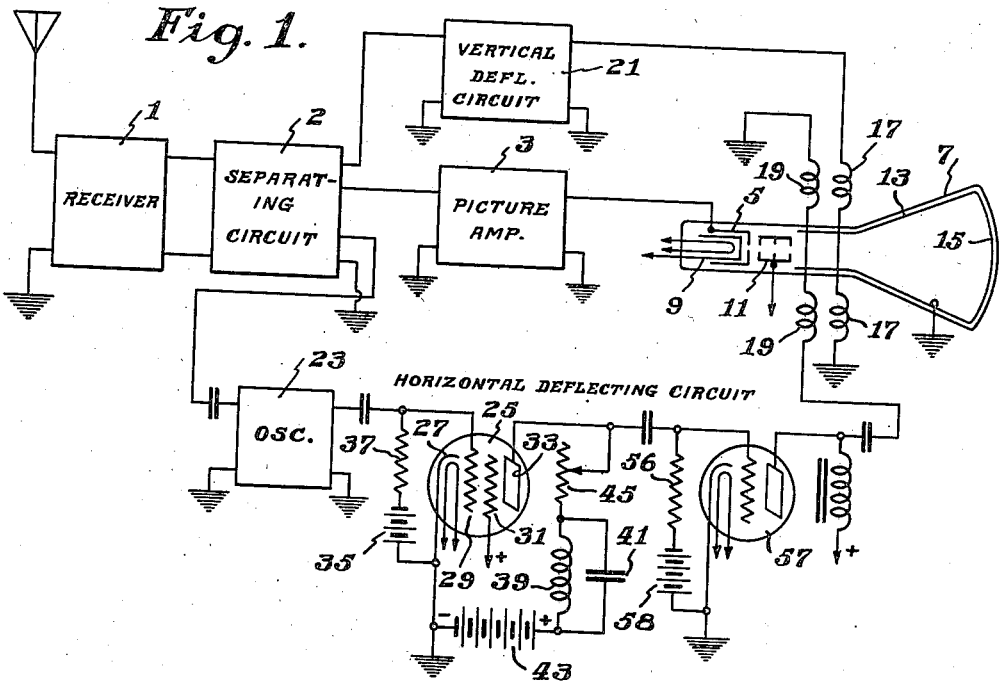

June 29, 1937.                    A. W. VANCE                    2,085,402
              METHOD OF AND APPARATUS FOR PRODUCING ELECTRICAL WAVES
                    Filed Sept. 18, 1934          2 Sheets-Sheet 1

INVENTOR
Arthur W. Vance
BY J. R. Goldsborough
ATTORNEY

INVENTOR
Arthur W. Vance
BY J. R. Goldsborough
ATTORNEY

Patented June 29, 1937

2,085,402

UNITED STATES PATENT OFFICE 2,085,402

METHOD OF AND APPARATUS FOR PRODUCING ELECTRICAL WAVES

Arthur W. Vance, Philadelphia, Pa., assignor, by mesne assignments, to Radio Corporation of America, New York, N. Y., a corporation of Delaware Application September 18, 1934, Serial No. 744,533

12 Claims. (Cl. 250—36)

My invention relates to methods of and apparatus for producing electrical waves and more particularly waves of the so-called saw-tooth type.

In television systems employing a cathode-ray tube at either the transmitter or receiver it is desired to produce for scanning purposes either current or voltage having a saw-tooth wave shape depending upon whether deflecting coils or deflecting plates are utilized. One of the best known circuits for producing the desired current or voltage for deflection comprises a vacuum tube which has voltage supplied to its plate through a resistor, and a capacitor so connected that it is charged through the resistor and then discharged suddenly through the tube when the grid of the tube receives a positive voltage impulse. For deflecting coils, this circuit also includes a resistor so connected as to add a square-top voltage wave to the saw-tooth voltage-wave produced across the capacitor whereby the desired saw-tooth wave form is obtained in the deflecting coils.

A disadvantage of the above-described circuit is that an undesirably high voltage must be impressed upon the plate resistor since this resistor is given a high value in order that a good saw-tooth wave may be obtained.

An object of my invention is to provide an improved circuit for producing currents or voltages having a saw-tooth wave shape.

A further object of my invention is to provide an improved circuit for causing a current of saw-tooth wave shape to flow through the deflecting coils of a cathode-ray tube.

A still further object of my invention is to provide a cathode-ray tube deflecting circuit in which the above-mentioned disadvantage is avoided.

In practicing a preferred embodiment of my invention, I so connect an inductance coil and a capacitor in the plate circuit of a vacuum tube that the capacitor is charged through the inductance coil when the grid of the tube is highly negative and discharged through the vacuum tube when the grid is made less negative by a voltage impulse. By giving the inductance coil and capacitor a resonant frequency much lower than the frequency at which the voltage impulses are impressed upon the grid of the vacuum tube, the charging rate of the capacitor is made substantially linear whereby an almost perfect saw-tooth voltage wave appears across it.

The necessary square-top wave component for producing a saw-tooth wave of current through deflecting coils is obtained by connecting a resistor in the plate circuit of the vacuum tube in series with the inductance coil-capacitor combination.

Figure 2:
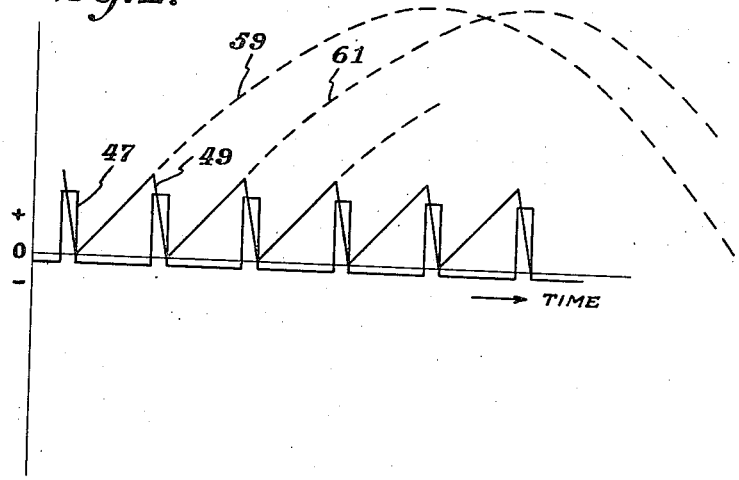
Figure 3:
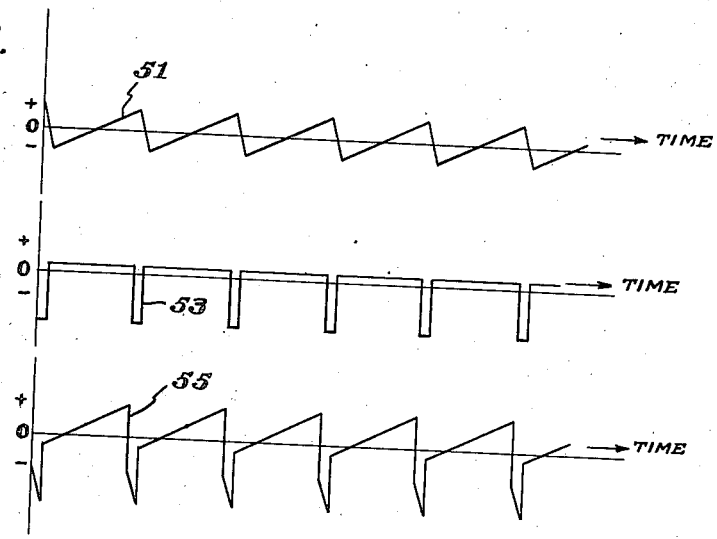
Figure 4:
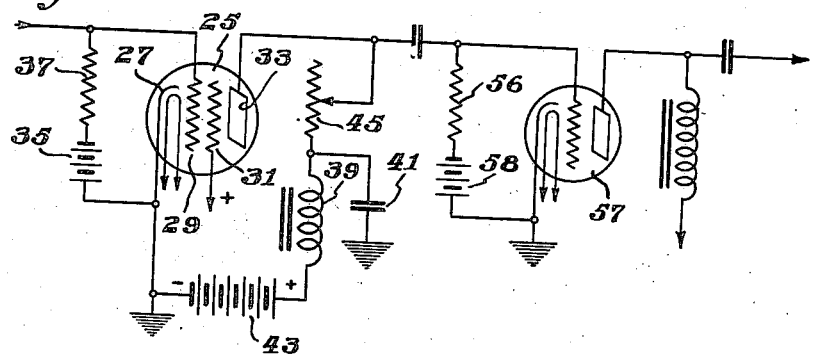
Figure 5:
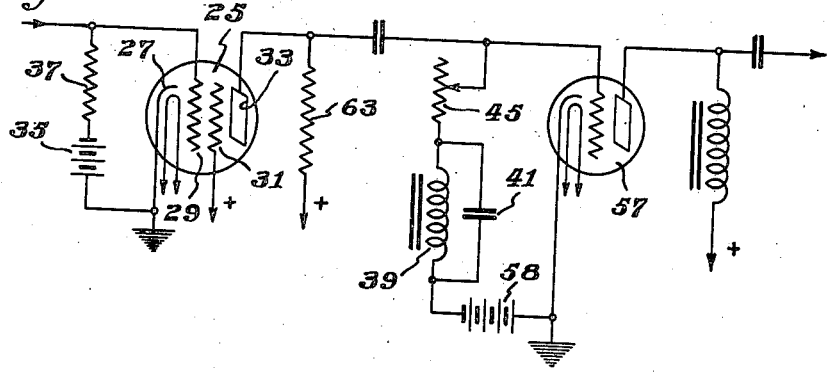

Other objects, features, and advantages of my invention will appear from the following description taken in connection with the accompanying drawings, in which Figure 1 is a circuit diagram of one embodiment of my invention, Figs. 2 and 3 are curves which are referred to in explaining the operation of the circuit shown in Fig. 1, and Figs. 4 and 5 are circuit diagrams of other embodiments of my invention.

Referring to Fig. 1 there is illustrated a television receiver which is designed to receive signals from a television transmitter of the type which transmits both picture and synchronizing signals on the same carrier wave. In a television system of this type a horizontal synchronizing impulse is transmitted at the end of each horizontal scanning line while a vertical synchronizing or framing impulse is transmitted at the end of each picture frame.

In order to permit separation, at the receiver, of the framing impulses from the horizontal synchronizing impulses, the framing impulses are transmitted with a different wave shape than the horizontal synchronizing impulses whereby they may be separated by means of filter circuits.

The television receiver comprises a radio receiver 1 which demodulates the incoming television signal and supplies the picture signals and the horizontal synchronizing and framing impulses to a suitable separating circuit 2. The picture signals are impressed upon a picture signal amplifier 3 which has its output circuit connected to the control grid 5 of a cathode-ray receiving tube 7. The cathode-ray tube 7 is of the type comprising an electron gun having a cathode 9, the control grid 5, and a first anode 11. The cathode-ray tube 7 also includes a second anode 13 and a fluorescent screen 15 at the end of the tube. In the particular apparatus illustrated the electron beam is caused to scan the fluorescent screen 15 by means of deflecting coils 17 and 19, the coils 17 causing deflection of the electron beam vertically and coils 19 causing deflection of the electron beam horizontally.

The framing impulses, after being separated from the picture signals and horizontal synchronizing impulses, are impressed upon a vertical deflecting circuit 21 which supplies a voltage of the proper wave form for causing a flow of a saw-tooth current through the vertical deflecting coils 17.

The horizontal synchronizing impulses are impressed upon a horizontal deflecting circuit which is constructed in accordance with one embodiment of my invention. In the particular circuit illustrated, the synchronizing impulses are impressed upon an oscillator 23 which may be of any suitable type such as a "Dynatron" or a clocking oscillator. The oscillator 23 supplies electrical impulses at the same frequency as the horizontal synchronizing impulses since the oscillator is held in synchronism with the impulses impressed thereon in a manner which is well understood.

The deflecting circuit includes a vacuum tube 25 which may be of the screen grid type having a cathode 27, a control grid 29, a screen grid 31, and a plate 33. The vacuum tube 25 is so adjusted that normally there is substantially no flow of plate current. As shown, this adjustment is made by biasing the tube beyond the cut-off point by means of a biasing battery 35 and resistor 37 connected between the control grid 29 and cathode 27. The screen grid 31 is connected to a source of positive potential of the proper value.

The plate circuit of the vacuum tube 25 includes an inductance coil 39 which has a capacitor 41 connected in parallel therewith. The plate is supplied with the necessary positive potential by means of a battery 43 or other suitable source of potential connected in series with the inductance coil 39. Where the deflecting circuit is used in combination with deflecting coils, a resistor 45 is included in the plate circuit in series with the inductance coil and capacitor combination.

The inductance coil 39 may be of either the air core or iron core type but in either case the inductance of the coil must be sufficient to give the coil 39 and capacitor 41 a resonant frequency which is substantially lower than the frequency of the horizontal synchronizing impulses. For example, if there are 10,000 synchronizing impulses per second the resonant frequency of the coil and condenser may be of the order of 1,000 cycles per second. It will, of course, be understood that the capacity in shunt to the coil 39 may be provided in the form of distributed capacity in the coil instead of in a separate capacitor unit.

The voltage impulses which are impressed upon the control grid of the vacuum tube 25 are indicated by the curve 47 in Fig. 2. At the end of each impulse a voltage having the wave form of a saw-tooth appears across the coil 39 and capacitor 41 as indicated by the curve 49 in Fig. 2 and the curve 51 in Fig. 3, while a square-top voltage wave as shown by the curve 53 in Fig. 3 appears across the resistor 45. The two voltages combine to give a voltage wave of the form shown by the curve 55 in Fig. 3 and this voltage is impressed upon the input circuit of an amplifier tube 57 and supplied by the amplifier to the deflecting coils 19. For reasons which need not be considered in this application, a voltage wave having both a saw-tooth wave component and a square-top wave component must be supplied to deflecting coils in order to obtain a flow of current therethrough which has a good saw-tooth wave form. The control grid of the tube 57 is maintained at the desired potential by means of a battery 58 connected in series with a resistor 56.

It is thought that the operation of the circuits shown in Fig. 1 can best be explained with reference to the curves shown in Fig. 2. Considering the inductance coil 39 and the capacitor 41 as a tuned circuit, if a voltage impulse is impressed thereacross, damped oscillations will be set up in the circuit. The beginning of such an oscillation is indicated by the dotted line curve 59. It will be noted that this is one half of a sine wave which has a substantially straight portion at the beginning of the wave. Since the synchronizing impulses occur at a frequency much greater than the resonant frequency of the coil and capacitor, succeeding impulses occur before the tuned circuit has time to complete very much of a half cycle of operation.

Considering the first synchronizing impulse illustrated in Fig. 2 it will be seen that it starts the tuned circuit in oscillation as indicated by the curve 59. Before the oscillation has progressed very far the next synchronizing impulse occurs which stops the first oscillation and starts another one which is indicated by the dotted line curve 61. It will be seen that a saw-tooth voltage wave has been produced across the coil and capacitor as indicated by the solid line curve 49.

Looking at the operation of the circuit in a slightly different way, when a voltage impulse is impressed upon the control grid 29, the tube 25 is rendered conducting whereby current begins to flow through the inductance coil 39 to store up energy or lines of flux therein. Assuming that the capacitor has previously been charged, it is discharged at this time through the vacuum tube 25. Upon the removal of the synchronizing impulse, the vacuum tube 25 becomes non-conducting and the lines of force in the inductance coil 39 collapse to charge the capacitor 41. Thus it will be seen that the capacitor 41 is being charged through the inductance coil and is being discharged through the vacuum tube. Attention is called to the fact that at the frequency of the impressed synchronizing impulses the reaction of the tuned circuit is capacitive.

In Fig. 4 there is shown a modification of the deflecting circuit illustrated in Fig. 1. In the two figures like parts are indicated by the same reference numerals. The only difference between the two circuits is that the capacitor 41, instead of being connected in parallel with the inductance coil 39 alone, is connected in parallel with both the inductance coil 39 and the voltage source 43. Since the impedance of the battery 43 for alternating currents is substantially zero, it appears that the operation of the modified circuit can be explained on the same theory as that given for Fig. 1.

However, the operation of this circuit can be more readily understood perhaps by noting that during the time the tube 25 is biased beyond cut-off the battery 43 is charging the capacitor 41 through the inductance coil 39 at a substantially linear rate, and that during the short time the tube 25 is rendered conducting by a synchronizing impulse the capacitor 41 discharges through the vacuum tube. It will be understood that in this circuit, as in the circuit shown in Fig. 1, the inductance coil 39 and the capacitor 41 form a circuit which is resonant at a frequency much lower than the frequency of the synchronizing impulses.

It will be seen that in the circuits shown in Figs. 1 and 4, the direct current impedance of the plate circuit is low so that almost the entire battery voltage is applied to the plate 33 of the vacuum tube 25. Because of the high inductance value of the coil 39, however, the capacitor 41 is charged at a substantially linear rate to produce a wave form across the capacitor which is almost a perfect saw-tooth.

It will be noted that the resistor 45, which is commonly referred to as a "peaking resistor", is in series with the parallel resonant circuit formed by the inductance coil 39 and the capacitor 41, instead of being in the resonant circuit itself. One of the main reasons for this is that it is difficult to make an inductance coil which has a high inductance value and a small amount of distributed capacity. With the "peaking resistor" in series with the parallel resonant circuit 39—41, the capacity of the capacitor 41 and the distributed capacity of the coil act as a single condenser in parallel with the inductance coil. With this arrangement, a good saw-tooth voltage wave is obtained across the parallel resonant circuit.

In Fig. 5, there is shown another embodiment of my invention which, in some cases, may be preferred to the circuits previously described. In Figs. 1 and 5 like parts are indicated by the same reference numerals. It will be seen that in the previously described circuits the grid resistor 56 of the amplifier tube 57 is in shunt to the capacitor 41 across which the saw-tooth wave is to appear. In order to obtain a good saw-tooth wave, it is necessary that this resistor have a high resistance value, in some cases much higher than the rated resistance for the tube being used. As a result, the operation of the amplifier tube 57, if slightly "gassy", may be erratic since eventually the grid, through ionic bombardment, may acquire a positive charge which will build up and result in destruction of the tube. This difficulty may be avoided by placing a parallel resonant circuit 39—41, similar to the one previously described, in the grid circuit of the amplifier tube 25 as shown in Fig. 5.

In this circuit a voltage is applied to the plate of the impulse tube 25 through a resistor 63. If a "peaking resistor" is required, it is connected in the grid circuit of the amplifier tube 57 in series with the parallel resonant circuit 39—41 as shown. As in the other circuits, the parallel resonant circuit should be resonant at a frequency which is low compared with the frequency of the synchronizing impulses.

Perhaps the operation of the circuit shown in Fig. 5 can be most readily understood by considering the circuit 39—41 simply as a condenser connected in series with the "peaking resistor" 45 and biasing battery 68, since it has a capacity reactance at the frequency of the synchronizing impulses. Considering the circuit in this way, it will be seen that the capacity represented by the tuned circuit is charged through the plate resistor 63 during the period the impulse tube 25 is biased beyond cut-off. When a synchronizing impulse is impressed upon the control grid of the impulse tube 25, the energy stored up in this capacity is discharged through the impulse tube. In this circuit, the plate resistor 63 should be given a fairly high value of resistance in order to obtain a linear charge of the capacity represented by the tuned circuit. It will be understood that since the "peaking resistor" 45 has a low resistance value compared with the resistance of the grid resistor 56 in the other circuits, the resistance of the circuit between the input electrodes of tube 57 has a comparatively low value.

If deflecting plates are to be utilized in place of deflecting coils, the "peaking resistor" is omitted and the saw-tooth wave, which appears across the inductance coil and the capacitor is impressed directly upon the amplifier to supply a saw-tooth voltage wave across the deflecting plates.

While my improved circuit has been described in connection with the horizontal deflecting circuit, it should be understood that it may be employed in the vertical deflecting circuit if desired, the only requirement being that the inductance coil and capacitor be tuned to a much lower frequency so that they are resonant at a frequency below that of the vertical synchronizing impulses.

In some television systems it may be preferred to omit the oscillator 23 from the horizontal deflecting circuit, in which case the impulse tube 25 is driven directly by the received synchronizing impulses.

From the foregoing description it will be seen that by utilizing my invention a comparatively low cost television receiver may be constructed since the voltage supply unit, which usually comprises a rectifier and filter, may be designed to supply a lower voltage than when other deflecting circuits are employed. Another advantage of my invention is that by utilizing the embodiment shown in Fig. 5 it is possible to obtain a voltage having a good saw-tooth wave form without operating an amplifier tube under conditions such that its life may be short.

It will be apparent that various other modifications may be made in my invention and I desire, therefore, that only such limitations shall be placed thereon as are necessitated by the prior art and set forth in the appended claims.

I claim as my invention:

1. A deflecting circuit for a cathode-ray tube comprising an inductance coil having sufficient capacity in parallel therewith to form a circuit resonant at a certain frequency, and means for impressing voltage impulses upon said circuit which occur at a frequency substantially greater than said certain frequency whereby the reactance of said circuit is capacitive, and a utilization circuit connected across said coil.

2. A deflecting circuit for a cathode-ray tube comprising a condenser, means for charging said condenser through an inductance coil, and means for discharging said condenser periodically, the capacity of said condenser and the inductance of said coil having values such that the coil and condenser will not resonate at a frequency as high as the frequency at which said condenser is discharged.

3. In combination, an electric discharge tube having a control electrode and a plate circuit, an inductance coil and a condenser connected in parallel in said plate circuit, said coil and condenser being resonant at a frequency which is low compared with the frequency at which controlling impulses are to be impressed upon said grid, and a utilization circuit connected across said condenser.

4. In a television system in which voltage impulses are produced at a certain frequency for controlling the deflection of an electron beam, an electric discharge tube having a control electrode and a plate circuit, means for biasing said tube normally beyond plate current cut-off whereby plate current can flow only in response to one of said impulses being impressed upon said grid, and an inductance coil and a condenser connected in parallel in said plate circuit, said coil and said condenser being resonant at a frequency substantially lower than said certain frequency.

5. In combination, an electric discharge tube having a control electrode and a plate circuit, said tube being so adjusted that normally there is no flow of plate current, an inductance coil and a condenser connected in parallel in said plate circuit, said coil and condenser being resonant at a certain frequency, and means for impressing voltage impulses upon said control electrode periodically, said impulses having a value such as to produce a plate current flow and occurring at a frequency which is high compared with said frequency.

6. In combination, an electric discharge tube having a control electrode and a plate circuit, a source of potential in said plate circuit, an inductance coil and a condenser in parallel in said plate circuit and in series with said source, and means for impressing voltage impulses upon said control electrode periodically, said impulses occurring at a certain frequency, said coil and condenser having inductance and capacity values such that they are not resonant at a frequency as high as said certain frequency.

7. A deflecting circuit for cathode-ray tubes comprising an inductance coil having capacity in parallel therewith, a source of potential and a switching device connected in series with said inductance coil, means for connecting said source across said coil through said switching device at a certain frequency, said capacity and the inductance of said coil having values such that the coil will not resonate at a frequency as high as said certain frequency whereby a saw-tooth voltage wave is produced across said coil.

8. In a deflecting circuit for television receivers adapted to receive picture signals and synchronizing impulses, an impulse tube having an input circuit and a plate circuit, an amplifier tube having a grid circuit and an output circuit, said grid circuit being coupled to said plate circuit, and an inductance coil and a condenser connected in parallel in said grid circuit only, said coil and condenser being resonant at a substantially lower frequency than the frequency of the synchronizing impulses to be impressed upon said input circuit.

9. Apparatus according to claim 8 characterized in that a peaking resistor is connected in said grid circuit in series with said parallel resonant circuit.

10. Apparatus according to claim 8 characterized in that said plate circuit includes a plate resistor.

11. The method of producing a saw-tooth electrical wave through the use of a resonant network including an inductor and a capacitor which comprises impressing a substantially constant unidirectional potential across said network, periodically substantially interrupting the application of potential at a frequency higher than the resonant frequency of the network and utilizing the fluctuating potentials appearing across the said network.

12. In a deflecting circuit for a cathode-ray tube, a resistor, an inductance coil in series with said resistor to form a series circuit, a condenser in shunt to said inductance coil, means for applying voltage across said series circuit periodically at a certain frequency, said inductance coil and said condenser being resonant at a frequency substantially lower than said certain frequency, and a utilization circuit connected across said resistor and said condenser.

ARTHUR W. VANCE.